US005671635A

United States Patent [19]
Nadeau et al.

[11] Patent Number: 5,671,635
[45] Date of Patent: Sep. 30, 1997

[54] METHOD AND APPARATUS FOR MONITORING OF SPRING PACK DISPLACEMENT OF A MOTOR-OPERATED VALVE

[75] Inventors: Joseph N. Nadeau, Canton; John L. Lewis; Roger W. Carr, both of Acworth; Bryan E. Prather, Kennesaw, all of Ga.

[73] Assignee: Westinghouse Electric Corporation, Pittsburgh, Pa.

[21] Appl. No.: 338,367

[22] Filed: Nov. 14, 1994

[51] Int. Cl.$^6$ .................................................. G01M 19/00
[52] U.S. Cl. ......................................... 73/168; 73/862.191
[58] Field of Search ........................... 73/168, 862.191, 73/862.321, 862.541; 324/73.1, 772; 364/550, 551.01

[56] References Cited

U.S. PATENT DOCUMENTS

| | | | |
|---|---|---|---|
| 4,542,649 | 9/1985 | Charbonneau et al. | 73/168 |
| 4,690,003 | 9/1987 | MnNennamy et al. | 73/862.32 |
| 4,805,451 | 2/1989 | Leon | 73/168 |
| 4,856,327 | 8/1989 | Branam et al. | 73/168 |
| 4,879,511 | 11/1989 | Leon | 324/163 |
| 4,879,901 | 11/1989 | Leon | 73/168 |
| 4,882,937 | 11/1989 | Leon | 73/862.67 |
| 4,965,513 | 10/1990 | Haynes et al. | 324/158 |
| 4,978,909 | 12/1990 | Hendrix et al. | 324/77 B |

(List continued on next page.)

FOREIGN PATENT DOCUMENTS

WO-A-
8704244   7/1987   WIPO .

OTHER PUBLICATIONS

W. H. Hagman et al., "Motor-Operated Valve Systems for the MIT International Program on Enhanced Nuclear Power Plant Safety," pp. 3–30, Jan., 1993, The MIT International Program for Enhanced Nuclear Power Plant Safety, Progress Report, 93–001PR.

J. Chai, "Non-Invasive Diagnostics of Motor-Operated Valves," pp. 1–88, May, 1993, Massachusetts Institute of Technology.

*Primary Examiner*—Elizabeth L. Dougherty
*Attorney, Agent, or Firm*—Isaf, Vaughan & Kerr; Louis T. Isaf

[57] ABSTRACT

A system for measuring spring pack displacement of a motor-operated valve (MOV) includes at least one power line having a current. The system includes a current sensor for sensing the current and providing a plurality of digital current values, and a personal computer (PC) processor for acquiring a plurality of frequency values of one or more frequency signatures from the plurality of digital current values and calculating the spring pack displacement from the plurality of frequency values. The processor may include data storage for the plurality of digital current values for at least a time interval necessary to stroke the valve stem in either an open or closed direction. The MOV may include a motor pinion gear having a motor pinion tooth-meshing frequency, a worm shaft having a rotational frequency, a worm shaft gear having plural teeth, a worm having a worm lead, a worm gear having plural teeth and a worm gear tooth-meshing frequency, and a spring pack having a displacement. The frequency signatures may include the motor pinion tooth-meshing frequency and the worm gear tooth-meshing frequency. The processor may calculate the rotational frequency of the worm shaft from the motor pinion tooth-meshing frequency divided by a number of the plural teeth of the worm shaft gear, the number of rotations of the worm shaft from the integral of the rotational frequency of the worm shaft, and the number of the plural teeth of the worm gear being meshed from the integral of the worm gear tooth-meshing frequency. The processor may also calculate the spring pack displacement from the product of the worm lead times the difference of the number of the rotations of the worm shaft less the number of the plural teeth of the worm gear being meshed.

22 Claims, 8 Drawing Sheets

U.S. PATENT DOCUMENTS

| | | | |
|---|---|---|---|
| 5,009,101 | 4/1991 | Branam et al. | 73/168 |
| 5,029,597 | 7/1991 | Leon | 73/168 X |
| 5,142,906 | 9/1992 | Smith | 73/168 |
| 5,197,328 | 3/1993 | Fitgerald | 73/168 |
| 5,311,562 | 5/1994 | Palusamy et al. | 376/215 |
| 5,396,167 | 3/1995 | Leon | 324/772 X |
| 5,475,299 | 12/1995 | Leon | 324/772 X |

METHOD AND APPARATUS FOR MONITORING OF SPRING PACK DISPLACEMENT OF A MOTOR-OPERATED VALVE

BACKGROUND OF THE INVENTION

1. Field of the Invention

This invention relates to motor diagnosis and more particularly to monitoring of spring pack displacement of a motor-operated valve as a function of motor current.

2. Background Of Information

Motor-operated valves (MOVs) are used in a variety of applications, such as nuclear power plants and chemical process systems, to control flow and isolate various subsystems. MOVs comprise an actuator and a valve. The actuator includes a motor, a motor pinion gear, a helical worm shaft gear, a worm shaft, a worm, a spring pack, a limit switch, a torque switch, a worm gear, a drive sleeve and a stem nut. The valve includes a valve stem and a valve seat. The electrical motor is energized by alternating current (AC) or direct current (DC) power in order to turn a pinion gear which, in turn, drives the worm shaft gear and the worm shaft. A spline connects the worm shaft to the worm. Initially, the stiffness of the spring pack resists movement of the worm which rotates with the worm shaft and turns the worm gear. The rotation of the worm gear rotates the drive sleeve and the stem nut and, in turn, drives the valve stem along the drive sleeve and closes the valve.

Whenever the valve begins to close and seat, the valve stem becomes more difficult to drive. Furthermore, the stem nut and the worm gear become more difficult to turn. At this stage, the spline allows the worm to slide along the worm shaft and compress the spring pack. The torque switch, which is actuated by the compression of the spring pack, turns off the motor at an appropriate time.

Given the mechanical complexity of the MOV, a variety of operational faults may occur. For example, the gears may break, the valve stem may bend, or the limit switch may fail. Because of the generally hazardous operational environment of the MOV in the plant or system, and because such operational faults are internal to the MOV, these and other faults cannot be directly diagnosed under normal operation of the MOV.

U.S. Pat. No. 4,542,649 discloses a valve monitoring system which measures, records and correlates valve stem load, limit and torque switch positions, spring pack movement and motor current, and provides time related information on valve performance. The system includes instrumentation which is attached to the valve during testing and which is removed from the valve after testing. The information obtained from the system provides a direct indication of developing valve and operator problems, such as excessive or inadequate packing load, excessive inertia, proximity to premature tripping, incorrectly set operating limit and torque switches, improperly functioning thermal overload devices, inadequate or excessive stem thrust loads, gear train wear, stem damage and load relaxation.

U.S. Pat. No. 4,965,513 discloses a signal analysis method based on sensed motor current to determine steady-state values for motor slip frequency, motor shaft speed, worm gear tooth-meshing frequency or worm rotation speed, stem nut rotation frequency, drive belt revolution frequency, and pump wheel or pulley revolution frequency.

Motor-Operated Valve System for the MIT International Program on Enhanced Nuclear Power Plant Safety, dated January 1993, discloses a vibration signature analysis system having multiple accelerometers for detecting vibrations generated in physically isolated parts of the MOV. These vibrations are analyzed by the system to provide the position of the pinion gear and the worm gear.

It is also known to measure spring pack displacement using various sensors, such as electromechanical devices, which directly measure the physical displacement of the spring pack. Such sensors, however, necessitate being at the MOV, removing the access covers of the MOV, or, in some cases, bolting the sensor to the valve actuator. Furthermore, such measurements are generally time consuming and may require exposure to ionizing radiation, the use of scaffolding, or the shutdown of the plant or system using the MOV.

There is a need, therefore, for a simplified method or apparatus which measures the spring pack displacement of the MOV using existing instrumentation in the plant or system.

There is a more particular need for such a method or apparatus which uses the measured spring pack displacement in the diagnosis of MOVs in the plant or system.

There is another more particular need for such a method or apparatus which measures the spring pack displacement under normal operation of the MOV.

There is yet another more particular need for such a method or apparatus which measures the spring pack displacement at a remote location from the MOV.

SUMMARY OF THE INVENTION

These and other needs are satisfied by the invention which is directed to a system for measuring spring pack displacement of a motor-operated valve (MOV) including at least one power line having a current. The system includes a current sensor for sensing the current and providing a plurality of digital current values, and a processor for acquiring a plurality of frequency values of one or more frequency signatures from the plurality of digital current values and calculating the spring pack displacement from the plurality of frequency values. The current sensor may include a signal conditioner for conditioning the current to an analog signal and an analog to digital (A/D) converter for converting the analog signal to the plurality of digital current values.

The processor may acquire the plurality of frequency values of the one or more frequency signatures from the plurality of digital current values and calculate the spring pack displacement parameter. The processor may also include data storage for the plurality of digital current values for at least a time interval necessary to stroke the valve stem of the MOV in either the open or closed direction.

The MOV may include a motor pinion gear having a motor pinion tooth-meshing frequency, a worm shaft having a rotational frequency, a worm shaft gear having plural teeth, a worm having a worm lead, a worm gear having plural teeth and a worm gear tooth-meshing frequency, and a spring pack having a displacement. The frequency signatures may include the motor pinion tooth-meshing frequency and the worm gear tooth-meshing frequency. The processor may calculate the rotational frequency of the worm shaft, which equals the motor pinion tooth-meshing frequency divided by a number of the plural teeth of the worm shaft gear; the number of rotations of the worm shaft, which is related to the integral of the rotational frequency of the worm shaft; and the number of the plural teeth of the worm gear being meshed, which is related to the integral of the worm gear tooth-meshing frequency. The processor may also calculate the displacement of the spring pack, which equals the product of the worm lead times the difference of the number of the rotations of the worm shaft less the number of the plural teeth of the worm gear being meshed.

A method for measuring spring pack displacement of the MOV includes sensing the current of the power line and providing a plurality of digital current values, acquiring a plurality of frequency values of at least one frequency signature from the plurality of digital current values, and calculating the spring pack displacement parameter from the plurality of frequency values.

A measurement system for the MOV may include a current sensor for sensing the current of the power line and providing a plurality of digital current values; and a processor for acquiring a plurality of frequency values of at least one frequency signature from the plurality of digital current values and calculating, from the plurality of frequency values, the number of rotations of the worm shaft, the number of the plural teeth of the worm gear being meshed, and the displacement of the spring pack.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
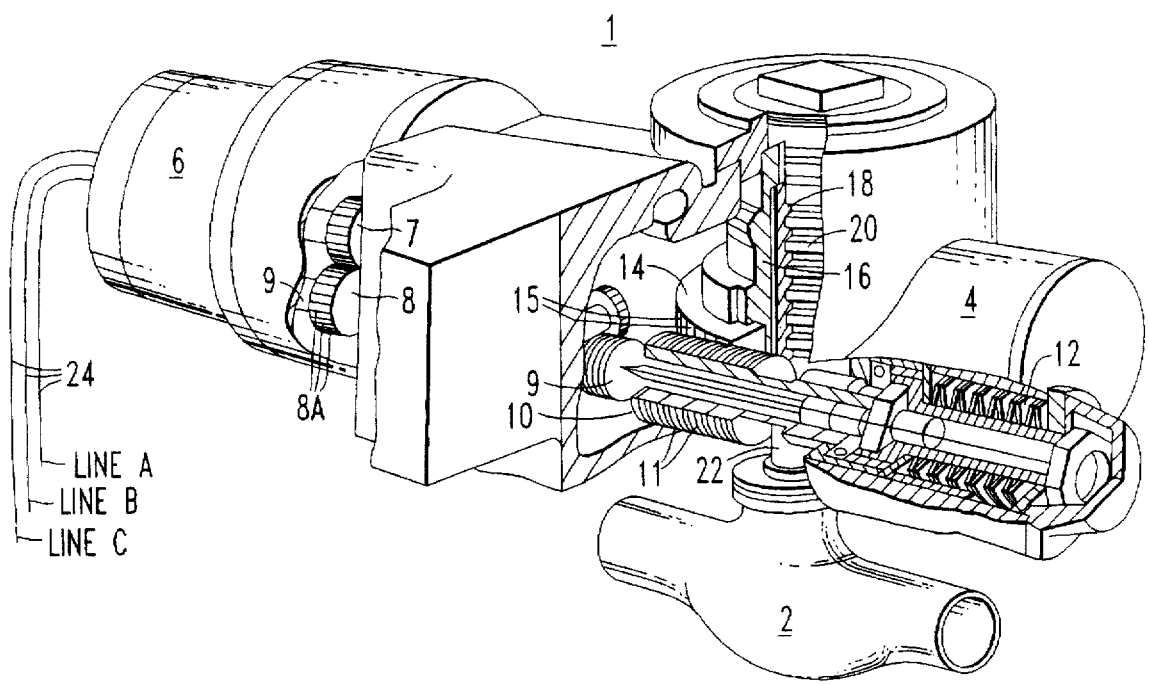
FIG. 1 is an isometric view of a motor-operated valve (MOV) with some parts cut away to illustrate its operation.

Referring to FIG. 1, a cut-away view of an exemplary motor-operated valve (MOV) 1 is illustrated, it being understood that the present invention is applicable to a variety of MOV types (e.g., gate valves, globe valves, butterfly valves, rotating rising valve stems, and non-rotating rising valve stems) which are available from numerous actuator and valve manufacturers and suppliers. The MOV 1 includes a valve 2 and an actuator 4 having an exemplary three-phase electrical motor 6. The valve 2 is connected in a process line (not shown) and is attached to the actuator 4. The valve 2 is opened or closed as required for system control by applying power to the electrical motor 6 which drives the actuator 4. The motor 6 turns a pinion gear 7 which drives a helical worm shaft gear 8 having a plurality of teeth 8A. The worm shaft gear 8 drives a worm shaft 9. A worm 10 having a plurality of threads 11 is splined to the worm shaft 9 in order to allow axial displacement of the worm 10 on the worm shaft 9. Axial displacement of the worm 10 is resisted by a compression spring pack 12. The spring pack 12 resists axial displacement of the worm 10 in either linear direction along the worm shaft 9. The spring pack 12 provides an axial displacement of the worm 10 which is proportional to a torque transmitted by the threads 11 of the worm 10 to a worm gear 14.

The threads 11 of the worm 10 drive the worm gear 14. The worm gear 14 has a plurality of teeth 15 and two 180 degree-spaced lugs (not shown) which are cast into the top portion of the worm gear 14. The worm gear 14 is free-floating around a shaft or drive sleeve 16. During motor-driven operation of the MOV 1, the two lugs of the worm gear 14 each engage a key (not shown) that is fitted into a vertical slot (not shown) in the drive sleeve 16, thus, causing the drive sleeve 16 to rotate. In turn, a stem nut 18, which is splined to the drive sleeve 16, rotates around a threaded portion 20 of a valve stem 22, in order to drive the valve stem 22 downward (upward) and close (open) the valve 2. The motor 6 is energized by three (LINE A,LINE B,LINE C) alternating current (AC) power lines 24 to rotate the pinion gear 7 which, in turn, drives the worm shaft gear 8 and the worm shaft 9, it being understood that the invention is applicable to MOVs and motors having any number of AC or direct current (DC) power lines.

A geared limit switch (not shown) and a torque switch (not shown) control the MOV 1. The geared limit switch is directly driven by a gear train (not shown) and is adjusted to operate at any point during a stroke of the valve 2. The geared limit switch is used to deenergize the motor 6 when the valve 2 reaches an open position. The torque switch measures the axial compression of the spring pack 12. The axial compression of the spring pack 12 is a direct measure of the output torque of the actuator 4 and an indirect measure of the output thrust of the actuator 4. The torque switch is used to deenergize the motor 6 when the valve 2 reaches a closed position. Alternatively, instead of being "torque closed", the MOV may be "limit closed" to a specific stem position or to a required torque value.

The pinion gear 7 of the motor 6 has a motor pinion tooth-meshing frequency ($f_p$) which is produced by the rotation of the pinion gear 7 and the worm shaft gear 8. The rotation of the pinion gear 7 and the worm shaft gear 8 cause the worm shaft 9 to rotate at a worm shaft rotational frequency ($f_r$). The worm shaft 9 and the splined worm 10 generally cause the rotation of the worm gear 14 and, thus, produce a worm gear tooth-meshing frequency ($f_w$) which is generated by the threads 11 of the worm 10 and the plural teeth 15 of the worm gear 14. Whenever the valve 2 begins to close and seat, the valve stem 22 becomes more difficult to drive, and the stem nut 18 and the worm gear 14 become more difficult to turn. At this stage, the worm 10 slides along the worm shaft 9 and compresses the spring pack 12. This results in a physical displacement of the spring pack 12 which is a spring pack displacement (D). The pitch of the worm 10, or the worm lead, is defined to be the number of inches per thread 11 along the longitudinal axis of the worm 10.

Figure 2:
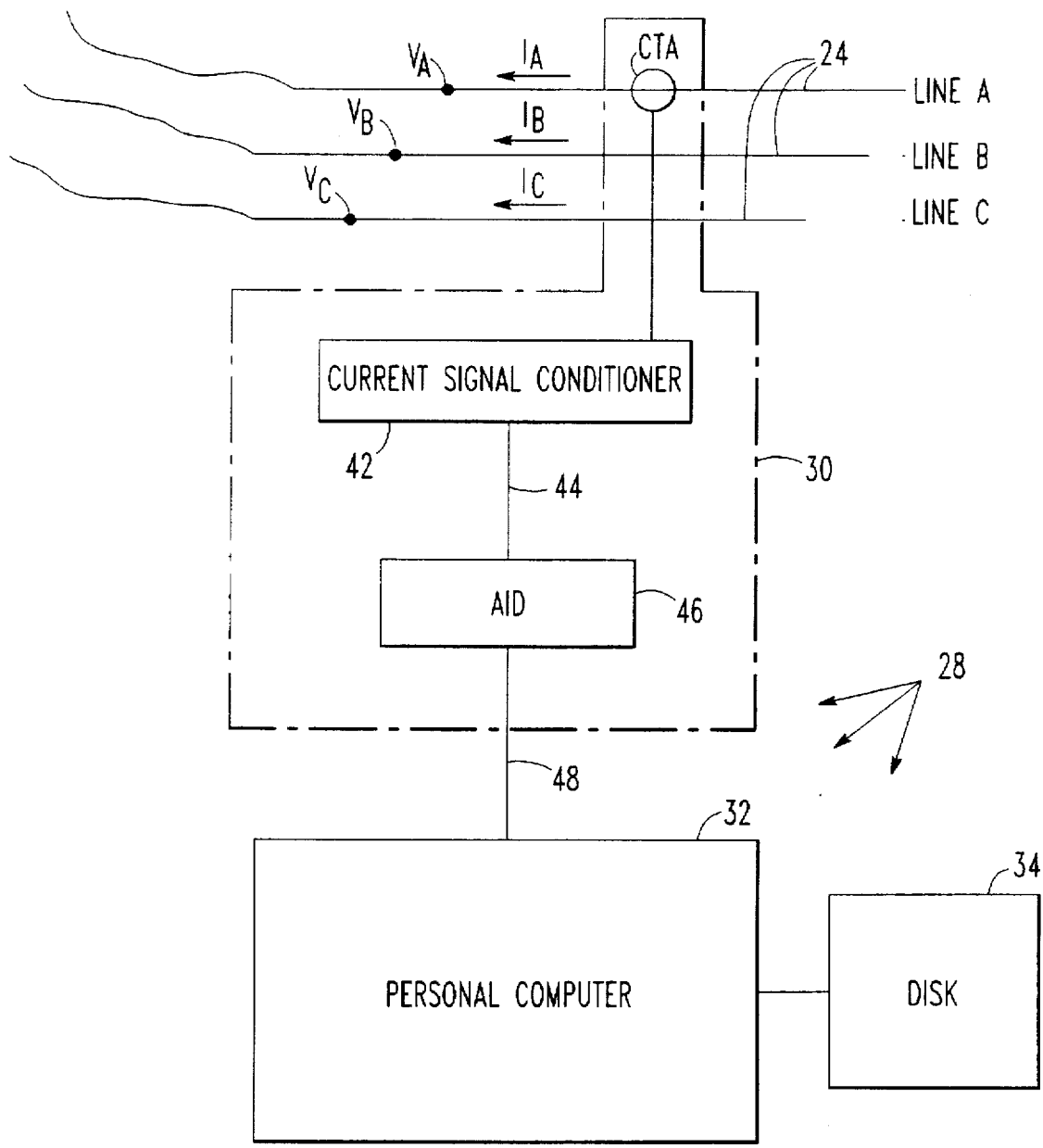
FIG. 2 is a schematic diagram in block form of diagnostic circuitry for a motor-operated valve (MOV) in accordance with the invention.

Referring now to FIG. 2, a schematic diagram in block form of a diagnostic circuit 26 for the MOV 1 of FIG. 1 is illustrated. A data acquisition unit 28 includes a current transformer CTA, an analog-to-digital (A/D) subsystem 30, and a portable personal computer (PC) 32 having suitable disk storage 34. The exemplary A/D subsystem 30 includes a current signal conditioner 42, a ribbon cable 44, and an A/D converter 46. A non-limiting example of the A/D subsystem 30 is provided by the National Instruments AT-2150C, or equivalent, signal conditioner and data acquisition boards which are installed in an I/O bus 48 of the PC 32. The PC 32 acquires the digital samples from the data acquisition board and writes the digital samples to a file on the disk 34 of the PC 32.

The current transformer CTA senses a current $I_A$ which flows in one of the three power lines 24, it being understood that the current transformer CTA may be clamped about the power line phase LINE A when necessary in order to provide a temporary diagnostic circuit 26 or, alternatively, the current transformer CTA may be permanently installed about the power line phase LINE A in order to provide an on-line diagnostic circuit 26, and it further being understood that any of the three currents $I_A$, $I_B$, $I_C$ may be utilized. The signal conditioner 42 conditions an analog signal from the current transformer CTA for input by the A/D converter 46.

Alternatively, the A/D subsystem 30 may monitor two of three voltages (e.g., $V_A$, $V_B$ and $V_C$) using two voltage signal conditioners (not shown), a multiplexer (not shown), and an A/D converter (not shown). The A/D subsystem 30 may also monitor two of three currents (e.g., $I_A$, $I_B$ and $I_C$) using two current transformers (only CTA is shown), two current signal conditioners (only 42 is shown), a multiplexer (not shown), and the A/D converter 46, it being understood that other equivalent embodiments of the present invention may utilize a calculated power signal from two or three phases (LINE A, LINE B, LINE C) of the power lines 24 instead of the exemplary single current signal. The various types of measurements which may be taken at the power lines 24, i.e., current, voltage or power, may be referred to as electrical parameter(s).

Figure 3A:
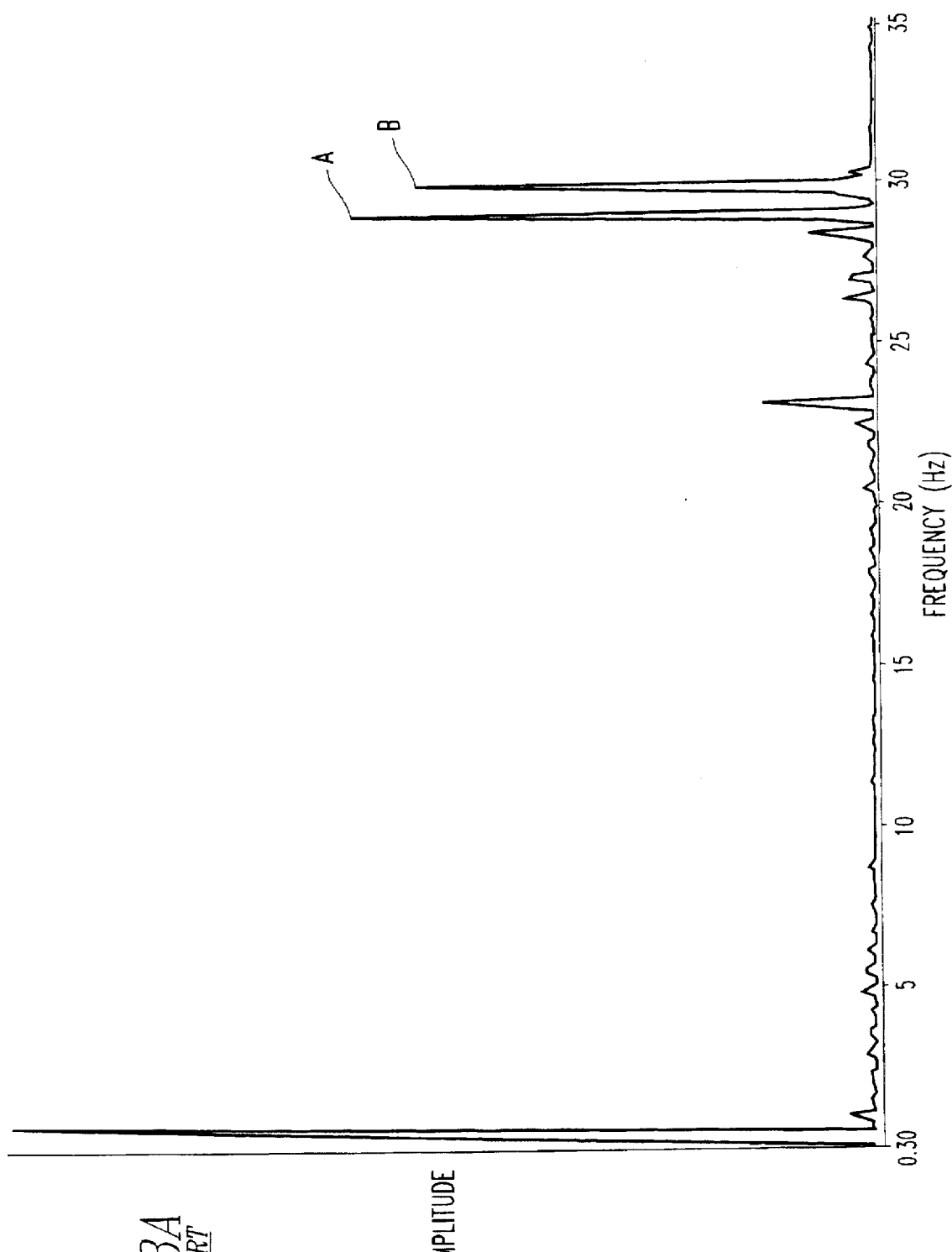
FIGS. 3A and 3B are graphs of various steady-state frequency signatures in accordance with the invention.

In the exemplary embodiment, during operation of the MOV 1 of FIG. 1, the motor pinion tooth-meshing frequency ($f_P$) ranges from approximately 200 to 2580 Hz and the worm gear tooth-meshing frequency ($f_W$) ranges from approximately 5 to 120 Hz. FIG. 3A is a graph of a steady-state frequency signature illustrating at point A the worm gear tooth-meshing frequency ($f_W$) of 28.931 Hz and at point B the motor speed of 29.907 Hz. As shown in FIG. 3A, the highest amplitude frequency components, between 5 Hz and 35 Hz, are $f_W$ and the motor speed.

Figure 3B:
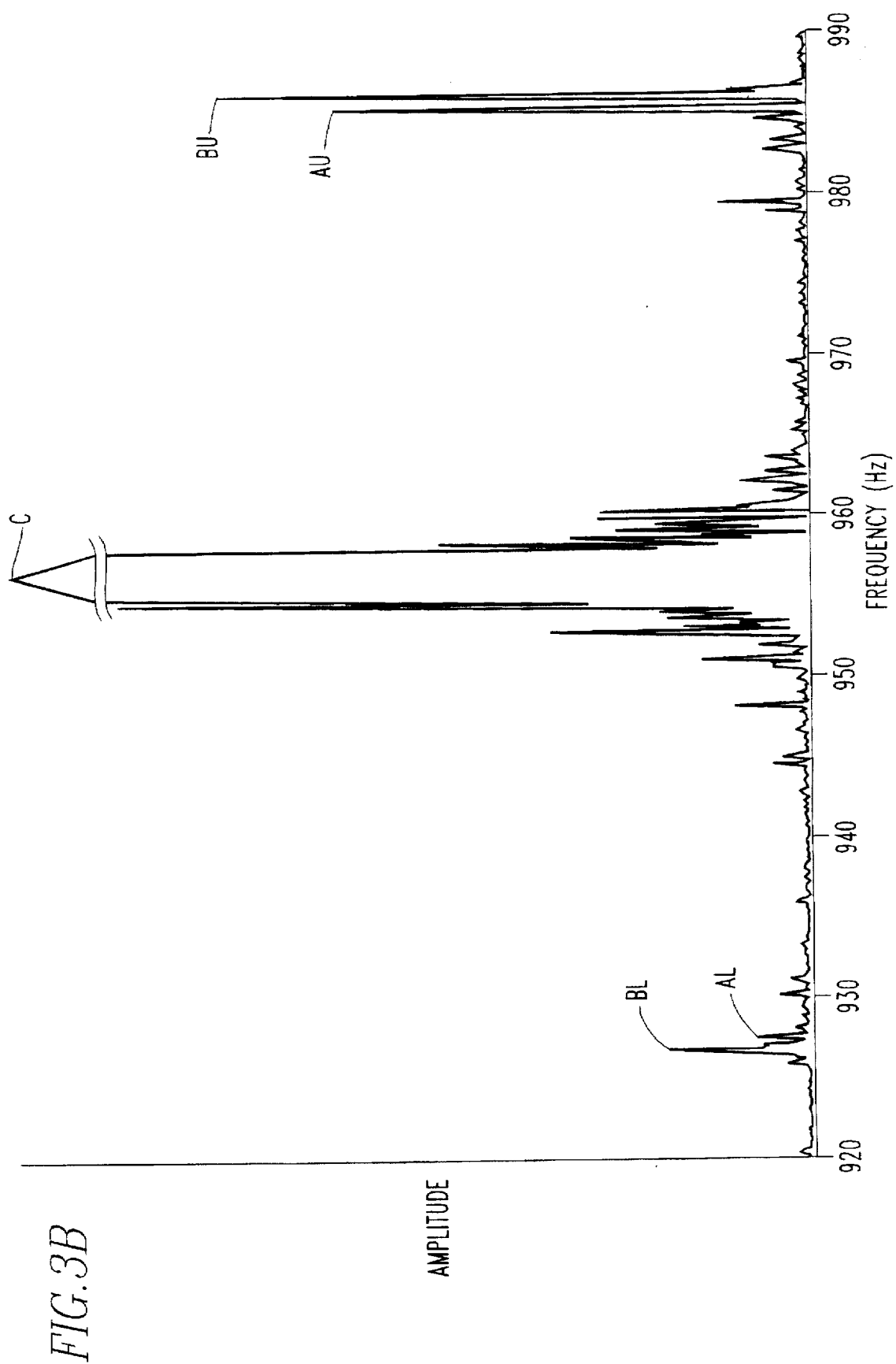

FIG. 3B is a graph of a steady-state frequency signature illustrating at point C the motor pinion tooth-meshing frequency ($f_P$) of 956.543 Hz. As shown in FIG. 3B, the highest amplitude frequency component, between 920 Hz and 990 Hz, is $f_P$. The graph also illustrates at point AL the lower side band of the worm gear tooth-meshing frequency ($f_W$) at 927.49 Hz, at point AU the upper side band of $f_W$ at 985.474 Hz, at point BL the lower side band of the motor speed at 926.638 Hz, and at point BU the upper side band of motor speed at 986.378 Hz.

Referring again to FIGS. 1 and 2, the exemplary A/D 46 converts the conditioned analog current signals to corresponding 16-bit digital values at a 6.45 KHz rate. These digital values are read by the PC 32 over the I/O bus 48 and are stored in the disk 34. In the exemplary embodiment, the disk 34 stores 6450 digital values per second for the AC current $I_A$. The digital values are acquired over an interval which is up to two minutes in duration. This interval is the time necessary to drive the valve stem 22 from a fully closed (open) position to a fully open (closed) position in order to open (close) the valve 2. Accordingly, the exemplary disk 34 requires at least 1.548 Mbytes of data storage (i.e., 6450 two-byte samples per second over an interval of two minutes). As discussed in greater detail below, the exemplary spring pack displacement (D) is calculated based on 6450 two-byte samples per second over the entire valve stroke or portion thereof (e.g., an interval of approximately 0.50 s in duration).

As explained in greater detail with FIG. 4 below, these digital samples may be analyzed by a data analysis program package such as, for example, National Instruments LabView and Joint Time Frequency Analysis software, or by Math Works MATLAB software with appropriate tool boxes such as Signal Processing and Signal Identification. In the exemplary embodiment, the PC 32 utilizes the digital values, which were collected in the time domain, and converts the digital values to the frequency domain using a variety of methods. Such methods, for example, may include a discrete fourier transform (DFT), a fast fourier transform (FFT), a power spectrum, or other frequency analysis techniques. The PC 32 then tracks components of the digital values in the frequency domain over time using various signal analysis methods. Such methods, for example, may include a Wigner-Ville distribution, a Teager Energy Operator, or other parametric modeling techniques. For example, the Wigner-Ville distribution (W(t, ω)), of Equation 1 below, is a signal processing function which tracks a frequency change with respect to time.

$$W(t,\omega) = \int_{-\infty}^{+\infty} e^{-j\omega\tau} I(t + \tau/2) I^*(t - \tau/2) d\tau \quad \text{(Eq. 1)}$$

where:

t is the time of a frequency sample;

ω is 2πf;

f is the frequency at time t;

I is a current value at time t; and

I* denotes a complex conjugate notation.

In any waveform which plots amplitude with respect to time, frequency information is not directly visible. In a corresponding spectrum which is calculated by a fourier transform, the frequency components are evident, however, the timing of such components is not visible. The Wigner-Ville distribution (W(t, ω)) provides both time and frequency information.

Figure 4:
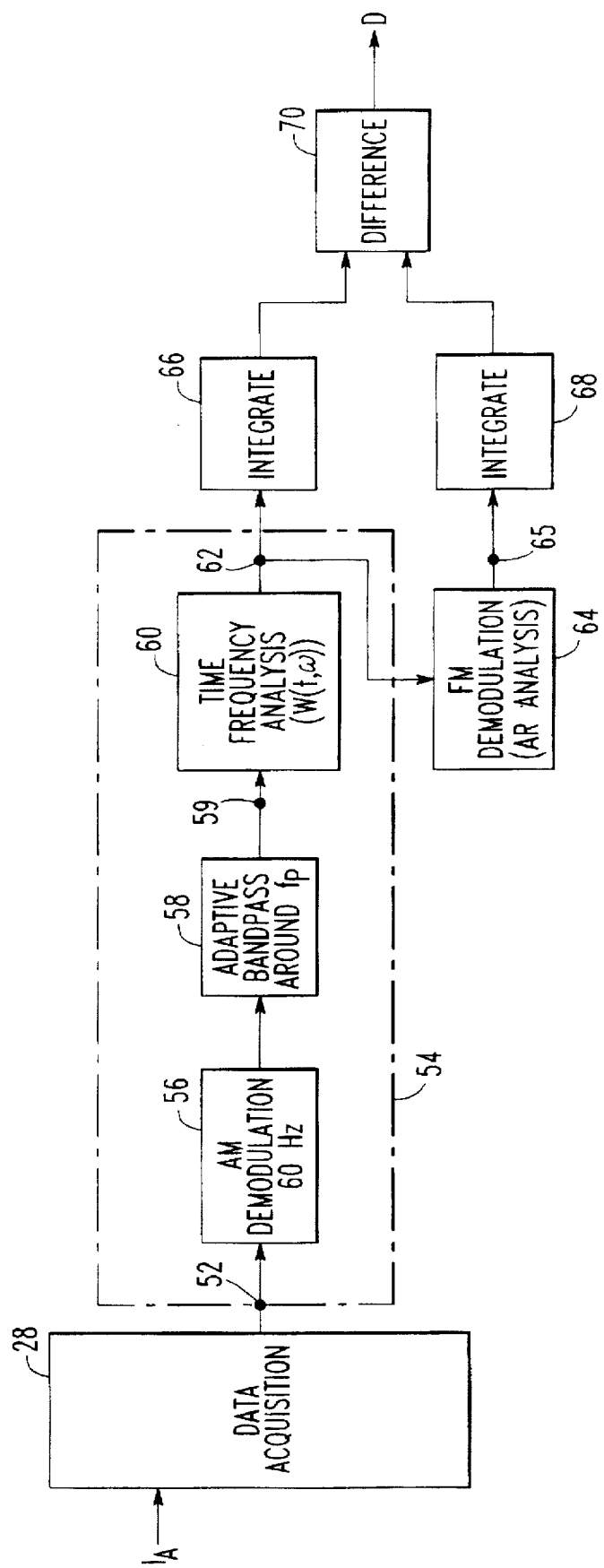
FIG. 4 is a block diagram of various frequency acquisitions and calculations in accordance with the invention.

Referring now to FIG. 4, in the exemplary embodiment, as described in greater detail below, the PC 32 of FIG. 1 collects the digital current values ($I_A$) and stores these current values in a two-dimensional array 52 with a corresponding collection time (t). The PC 32 then executes a function 54 which tracks the components of the digital current values in the frequency domain over time. A nonlimiting example of a routine which supports the function 54 is provided by the National Instruments Joint Time Frequency Analysis software. At block 56, the PC 32 amplitude modulation (AM) demodulates the digital current values in the array 52 to obtain the side band components of the line frequency (e.g., 60 Hz) of LINE A of FIG. 1 at their respective frequencies. There are various methods to obtain the demodulated signal such as, for example, the Hilbert transform or the Teager Energy Operator. Then, at block 58, an adaptive bandpass filter is used to increase the signal to noise ratio of the output signal 59. Next, at block 60, the instantaneous frequency of the signal 59 over time is recovered using a joint time frequency analysis technique such as, for example, Wigner-Ville or Choi-Williams. These techniques, which are used because of the non-stationary frequency of the signal 59, produce the signal energy with respect to time. The exemplary Wigner-Ville distribution (W(t, ω)) of Equation 1 is calculated for the highest amplitude frequency component (i.e., $f_P$=956.543 Hz). Then, a two-dimensional array 62 of frequency versus time (i.e., W(t, ω) or W(t,f)) is output by the block 60 as discussed with FIG. 5A below. The spacing (Δt) between elements in the time dimension of the exemplary array 62 is provided by Equation 1A below. The spacing (Δf) between elements in the frequency dimension of the exemplary array 62 is provided by Equation 1B.

$$\Delta t = R/S \quad \text{(Eq. 1A)}$$

$$\Delta f = S/2^k \quad \text{(Eq. 1B)}$$

where: R=1n (Δs);

Δs is the number of samples per Δt;

S is 6450 samples per second in the exemplary embodiment; and k is a positive integer.

Figure 5A:
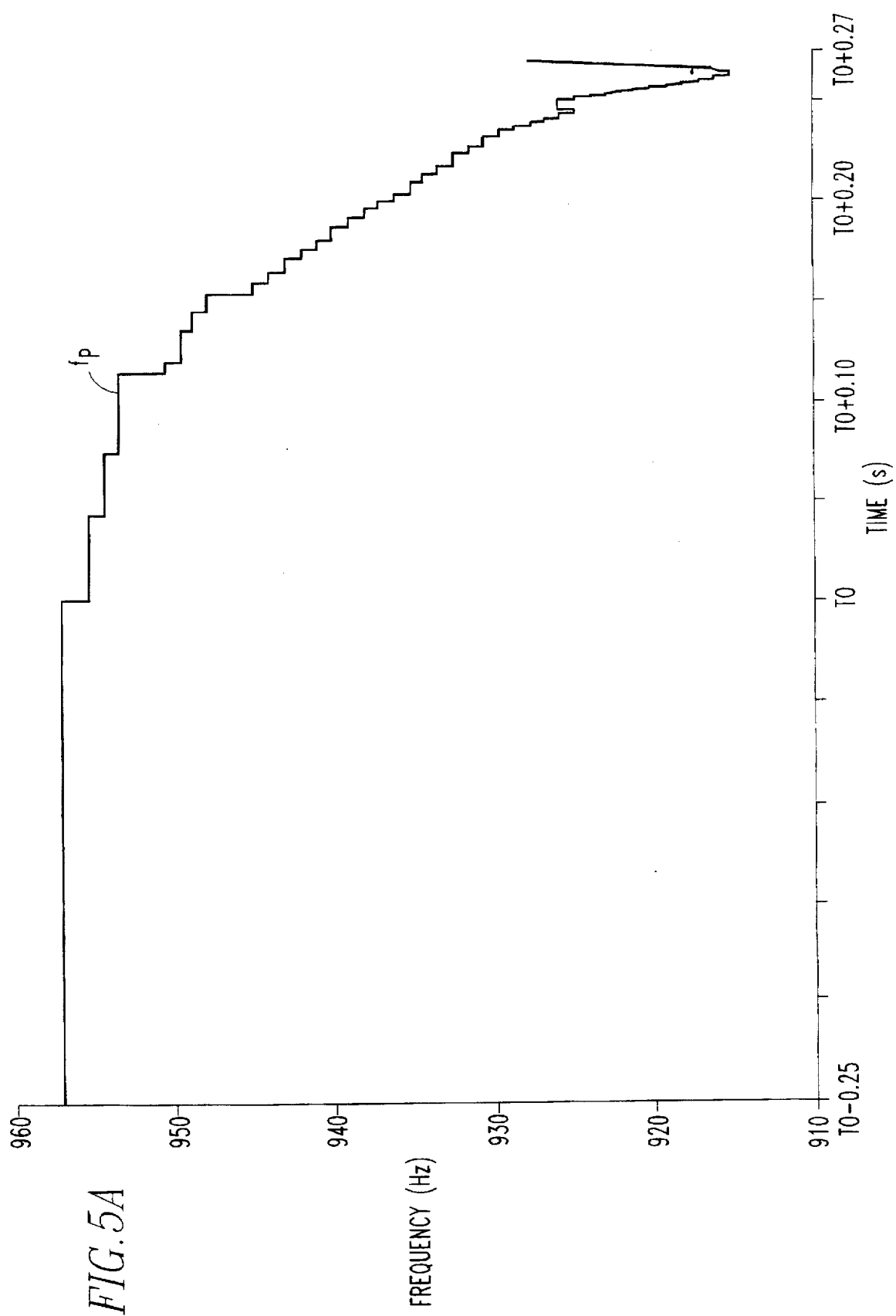
FIG. 5A is a graph of motor pinion tooth-meshing frequency with respect to time in accordance with the invention.

FIG. 5A is a graphical representation of the motor pinion tooth-meshing frequency ($f_P$) with respect to time over a 0.52 s time interval in the array 62 of FIG. 4. As illustrated, $f_p$ is initially constant at about 956.543 Hz. Then, beginning at T0, the frequency $f_p$ changes through time T0+0.27 s. This change of frequency corresponds to the time interval when, as discussed above with FIG. 1, the valve 2 begins to close and seat, and the stem nut 18 and the worm gear 14 become more difficult to turn.

Referring again to FIG. 4, at block 64, the instantaneous frequency components associated with tooth meshing of the worm gear 14 of FIG. 1 are frequency modulation (FM) demodulated using auto regressive (AR) models (e.g., parametric techniques). The AR model tracks the low frequency worm gear tooth meshing frequency ($f_W$). Then, a two-dimensional array 65 of worm gear tooth-meshing frequency ($f_W$) versus time is output by the block 64.

Figure 5B:
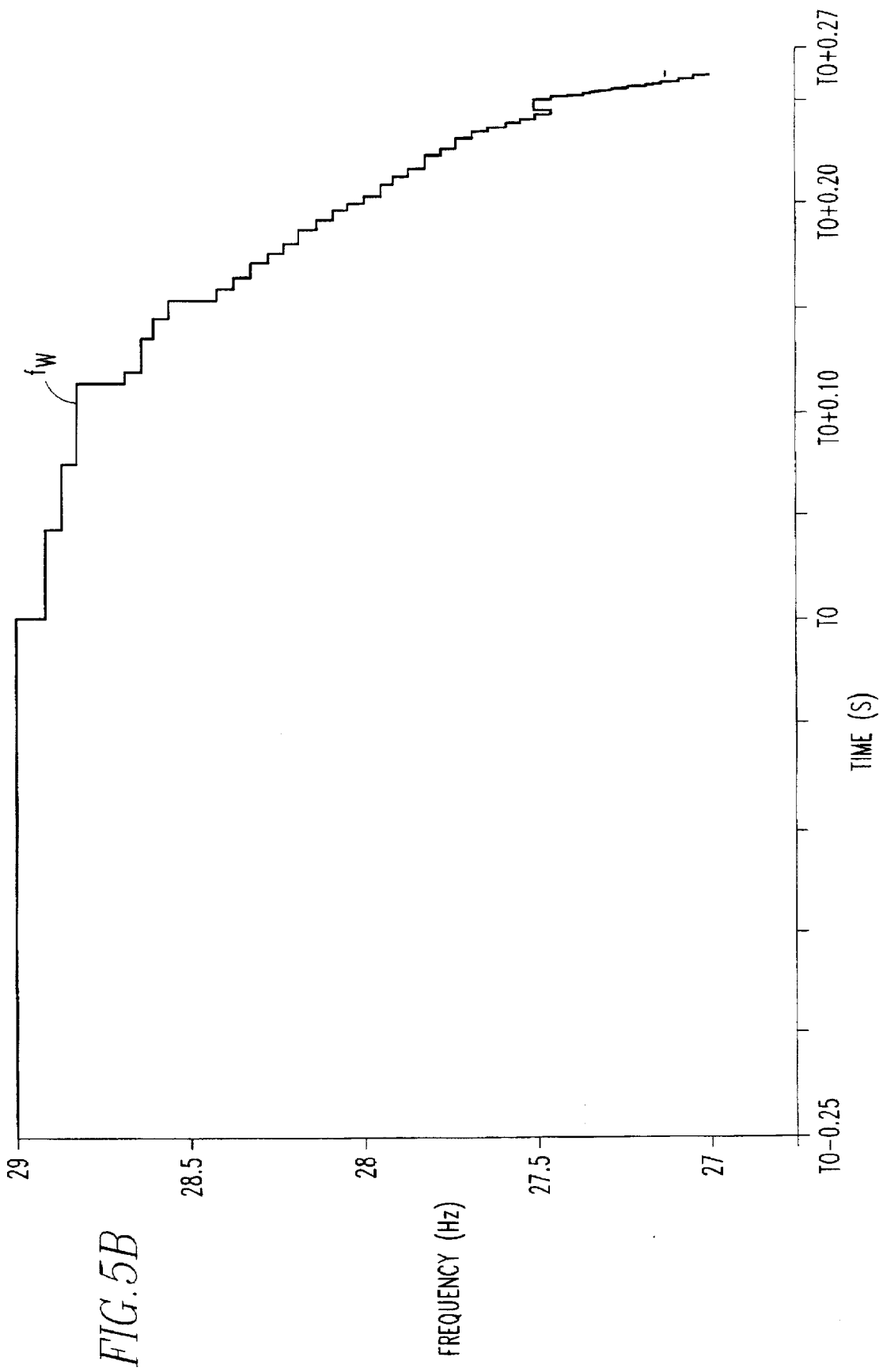
FIG. 5B is a simulated graph of worm gear tooth-meshing frequency with respect to time in accordance with the invention.

FIG. 5B is a simulated graphical representation of the worm gear tooth-meshing frequency ($f_W$) with respect to time over a 0.50 s time interval as output at node 65 of FIG. 4. As illustrated, $f_W$ is initially constant at about 28.931 Hz. Then, prior to time T0, the frequency $f_W$ changes through time T0 +0.25 s. This change of frequency corresponds to the time interval when, as discussed above with FIG. 1, the valve 2 begins to close and seat, and the worm 10 slides along the worm shaft 9 and compresses the spring pack 12.

Referring to FIG. 1 and Equation 2 below, the worm shaft rotational frequency ($f_S$) as a function of time is derived from the motor pinion tooth-meshing frequency ($f_P$) as a function of time divided by the number of plural teeth 8A of the worm shaft gear 8 ($N_{WST}$). The number of revolutions of the worm shaft 9 ($R_W$) as a function of time between time T0 and time T is provided by the integral of Equations 3A–3B or, alternatively, by the summation of Equation 3C.

$$f_S(t) = f_P(t)/N_{WST} \quad \text{(Eq. 2)}$$

where:

$N_{WST}$ is the number of plural teeth 8A of the worm shaft gear 8.

$$R_w(t) = \int_{T0}^{T} f_S(t)dt \quad \text{(Eq. 3A)}$$

$$R_w(t) = \int_{T0}^{T} (f_P(t)/N_{WST})dt \quad \text{(Eq. 3B)}$$

$$R_w(t) = \sum_{n=N0}^{n=NT} (f_P(n)/N_{WST})/S \quad \text{(Eq. 3C)}$$

where:

$R_w(t)$ is the number of revolutions of the worm shaft 9 between time T0 and time T;

T0 is the start of the period of compression of the spring pack 12;

N0 is the frequency sample at time T0; and

NT is the frequency sample at time T.

Referring to Equations 4A–4B below, the number of teeth 15 of the worm gear 14 being meshed by the threads 11 of the worm 10 ($N_{WGTM}$) as a function of time between time T0 and time T is provided by the integral of Equation 4A or the summation of Equation 4B.

$$N_{WGTM}(t) = \int_{T0}^{T} f_w(t)dt \quad \text{(Eq. 4A)}$$

$$N_{WGTM}(t) = \sum_{n=N0}^{n=NT} (f_w(n))/S \quad \text{(Eq. 4B)}$$

where:

$N_{WGTM}(t)$ is the number of teeth 15 of the worm gear 14 being meshed by the threads 11 of the worm 10 between time T0 and time T.

Referring to Equation 5 below, the spring pack displacement (D) as a function of time is derived from the product of the worm lead of the worm 10 ($L_W$) times the difference between the number of revolutions of the worm shaft 9 ($R_W$) as a function of time and the number of teeth 15 of the worm gear 14 being meshed by the threads 11 of the worm 10 ($N_{WGTM}$) as a function of time.

$$D(t) = (\text{inches}) = L_W(R_W(t) - N_{WGTM}(t)) \quad \text{(Eq. 5)}$$

where:

$L_W$ is the worm lead of the worm 10 (inches per each of the threads 11 along the longitudinal axis of the worm).

Figure 6:
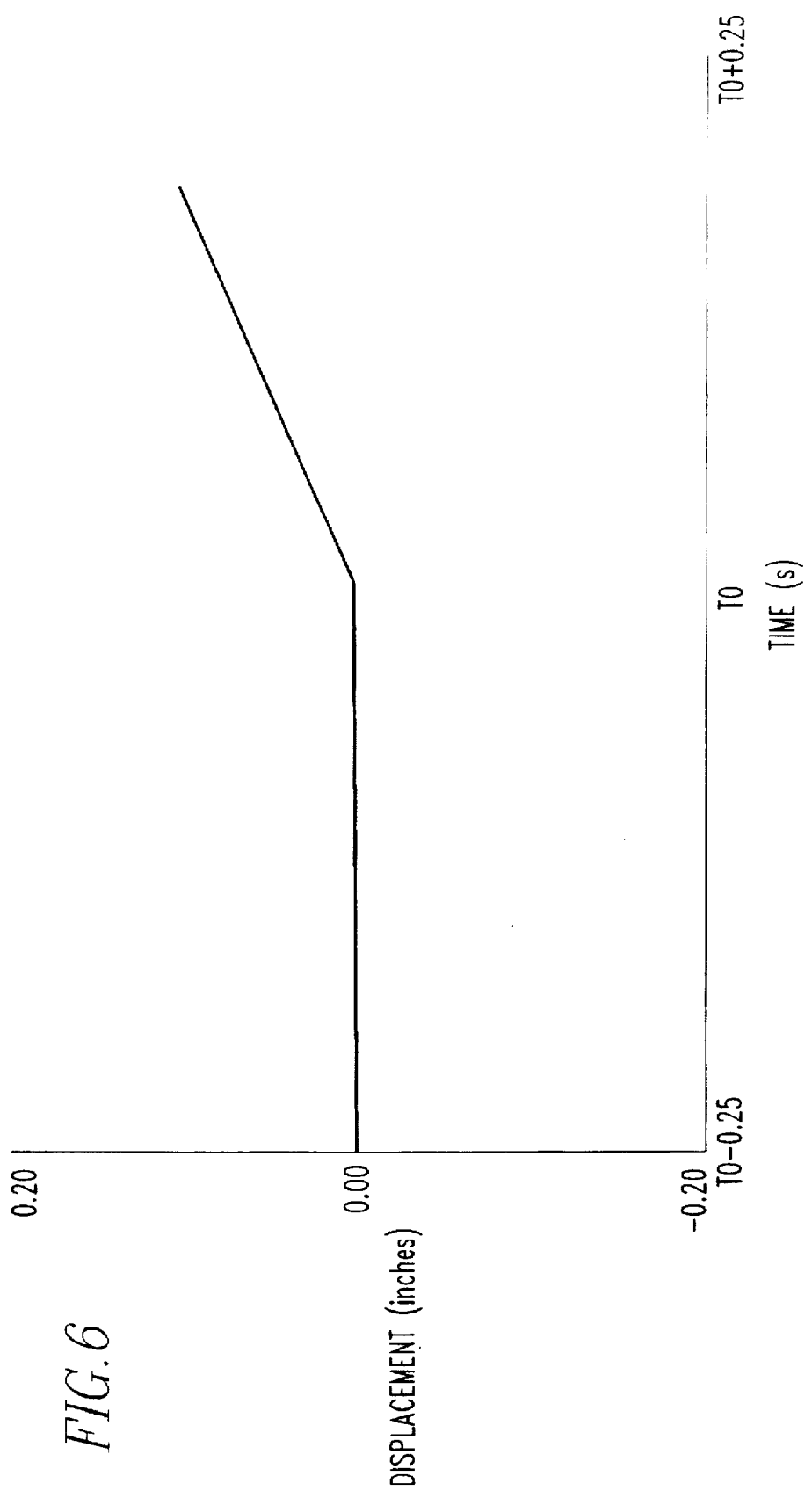
FIG. 6 is a simulated graph of spring pack displacement with respect to time in accordance with the invention.

Referring again to FIG. 4, the PC 32 of FIG. 1 uses Equation 3C and calculates the number of revolutions of the worm shaft 9 ($R_W$) as a function of time at block 66. Similarly, the PC 32 uses Equation 4B and calculates the number of teeth 15 of the worm gear 14 being meshed by the threads 11 of the worm 10 ($N_{WGTM}$) as a function of time at block 68. Then, at block 70, the spring pack displacement (D) as a function of time is calculated using Equation 5. FIG. 6 is a simulated graph of D with respect to time over a 0.50 s time interval as output by block 70 of FIG. 4.

Spring pack displacement is a reliable representation of actuator torque and, by knowing or assuming a stem factor, can provide a reasonable prediction of stem thrust. The calculated spring pack displacement (D) may also be used to assist in the diagnosis of a variety of valve and actuator problems (e.g., full spring pack compression, incorrect setting of the torque bypass switch, obstruction in the valve seat, bent valve stem, valve backseating, hydraulic locking in the spring pack, changes in the spring pack gap, etc.), in estimating actuator efficiency, or in trending the displacement with respect to time.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. A system for measuring spring pack displacement of a motor-operated valve (MOV) including at least one power line having an electrical parameter, said system comprising:

means for sensing the electrical parameter of said at least one power line and providing a plurality of electrical parameter values; and processing means for acquiring a plurality of frequency values of at least one frequency signature from the plurality of electrical parameters values and calculating a spring pack displacement parameter from the plurality of frequency values;

wherein said electrical parameter comprises voltage or power.

2. The system as recited in claim 1 wherein said sensing means includes signal conditioning means for conditioning the electrical parameters to an analog signal and analog to digital (A/D) conversion means for converting the analog signal to a plurality of digital values.

3. The system as recited in claim 1 wherein said processing means includes data storage means for storing the plurality of electrical parameters values.

4. The system as recited in claim 3 wherein said processing means further includes digital computing means for acquiring the plurality of frequency values of at least one frequency signature from the plurality of electrical parameter values and calculating the spring pack displacement parameter.

5. The system as recited in claim 3 wherein the data storage means stores at least 6450 of the plurality of electrical parameter values per second.

6. The system as recited in claim 5 wherein said MOV includes a valve stem having an open direction and a closed direction, and wherein the data storage means stores the plurality of electrical parameter values for at least a time interval necessary to stroke the valve stem in either the open direction or the closed direction.

7. The system as recited in claim 1 wherein said processing means includes digital computing means for acquiring the plurality of frequency values of at least one frequency signature from the plurality of electrical parameter values and calculating the spring pack displacement parameter.

8. The system as recited in claim 7 wherein the digital computing means includes acquiring means for acquiring the plurality of frequency values of at least one frequency signature from the plurality of electrical parameter values in a frequency domain.

9. The system as recited in claim 8 wherein the digital computing means further includes calculation means for calculating the spring pack displacement parameter in a time domain.

10. The system as recited in claim 1 wherein said MOV further includes a motor pinion gear having a motor pinion tooth-meshing frequency, and wherein the at least one frequency signature includes the motor pinion tooth-meshing frequency.

11. The system as recited in claim 10 wherein said MOV further includes a worm shaft having a rotational frequency and a worm shaft gear having plural teeth, and wherein said processing means includes digital computing means for calculating the rotational frequency of the worm shaft, the rotational frequency equals the motor pinion tooth-meshing frequency divided by a number of the plural teeth of the worm shaft gear.

12. The system as recited in claim 11 wherein the digital computing means includes calculation means for calculating a number of rotations of the worm shaft, the number of rotations is related to the integral of the rotational frequency of the worm shaft.

13. The system as recited in claim 1 wherein said MOV further includes a worm gear having plural teeth and a worm gear tooth-meshing frequency, and wherein the at least one frequency signature includes the worm gear tooth-meshing frequency.

14. The system as recited in claim 13 wherein said processing means includes digital computing means for calculating a number of the plural teeth of the worm gear being meshed, the number of the plural teeth of the worm gear being meshed is related to the integral of the worm gear tooth-meshing frequency.

15. The system as recited in claim 1 wherein said MOV further includes a motor pinion gear having a motor pinion tooth-meshing frequency, a worm shaft having a rotational frequency, a worm shaft gear having plural teeth, a worm having a worm lead, a worm gear having plural teeth and a worm gear tooth-meshing frequency, and a spring pack having a displacement; and wherein the at least one frequency signature includes the motor pinion tooth-meshing frequency and the worm gear tooth-meshing frequency; and wherein said processing means includes digital computing means for calculating the rotational frequency of the worm shaft, the rotational frequency equals the motor pinion tooth-meshing frequency divided by a number of the plural teeth of the worm shaft gear, calculation means for calculating a number of rotations of the worm shaft, the number of rotations of the worm shaft is related to the integral of the rotational frequency of the worm shaft, calculation means for calculating a number of the plural teeth of the worm gear being meshed, the number of the plural teeth of the worm gear being meshed is related to the integral of the worm gear tooth-meshing frequency, and calculation means for calculating the displacement of the spring pack, the displacement equals a product of the worm lead times a difference of the number of the rotations of the worm shaft less the number of the plural teeth of the worm gear being meshed.

16. The system as recited in claim 7 wherein said MOV further includes a worm shaft having a rotational frequency, a worm shaft gear having plural teeth, and a worm gear having plural teeth and a worm gear tooth-meshing frequency, and wherein the digital computing means includes calculation means for calculating the rotational frequency of the worm shaft, a number of rotations of the worm shaft, and a number of the plural teeth of the worm gear being meshed.

17. The system as recited in claim 16 wherein said MOV further includes a worm having a worm lead, and a spring pack having a displacement, and wherein the digital computing means further includes calculation means for calculating the displacement of the spring pack, the displacement equals a product of the worm lead times a difference of the number of the rotations of the worm shaft less the number of the plural teeth of the worm gear being meshed.

18. A method for measuring spring pack displacement of a motor-operated valve (MOV) including at least one power line having an electrical parameter, said method comprising:

sensing the electrical parameter of said at least one power line and providing a plurality of electrical parameter values;

acquiring a plurality of frequency values of at least one frequency signature from the plurality of electrical parameter values; and calculating a spring pack displacement parameter from the plurality of frequency values;

wherein said electrical parameter comprises voltage or power.

19. The method as recited in claim 18 wherein said MOV includes a motor pinion gear having a motor pinion tooth-meshing frequency, and a worm gear having plural teeth and a worm gear tooth-meshing frequency, and wherein the at least one frequency signature includes the motor pinion tooth-meshing frequency and the worm gear tooth-meshing frequency.

20. The method as recited in claim 19 wherein said MOV further includes a worm shaft having a rotational frequency, a worm shaft gear having plural teeth, a worm having a worm lead, and a spring pack having a displacement, said method further comprising:

calculating the rotational frequency of the worm shaft, the rotational frequency equals the motor pinion tooth-meshing frequency divided by a number of the plural teeth of the worm shaft gear;

calculating a number of rotations of the worm shaft, the number of rotations is related to the integral of the rotational frequency of the worm shaft;

calculating a number of the plural teeth of the worm gear being meshed, the number of the plural teeth being meshed is related to the integral of the worm gear tooth-meshing frequency; and calculating the displacement of the spring pack, the displacement equals a product of the worm lead times a difference of the number of the rotations of the worm shaft less the number of the plural teeth of the worm gear being meshed.

21. A measurement system for a motor-operated valve (MOV) including at least one power line having an electrical parameter, a worm shaft having a rotational frequency, a worm gear having plural teeth and a worm gear tooth-meshing frequency, and a spring pack having a displacement, said system comprising:

means for sensing the electrical parameter of said at least one power line and providing a plurality of electrical parameter values; and processing means for acquiring a plurality of frequency values of at least one frequency signature from the plurality of electrical parameter values and calculating, from the plurality of frequency values, a number of rotations of the worm shaft, a number of the plural teeth of the worm gear being meshed, and the displacement of the spring pack.

22. The system as recited in claim 21 wherein said MOV further includes a worm having a worm lead, and wherein said processing means includes calculation means for calculating the displacement of the spring pack, the displacement of the spring pack equals a product of the worm lead times a difference of the number of the rotations of the worm shaft less the number of the plural teeth of the worm gear being meshed.

* * * * *